United States Patent Office 3,162,610
Patented Dec. 22, 1964

3,162,610
ADHESIVES
Carlos M. Samour, Wellesley Hills, Mass., assignor to The Kendall Company, Boston, Mass., a corporation of Massachusetts
No Drawing. Filed Mar. 13, 1961, Ser. No. 95,038
13 Claims. (Cl. 260—4)

This invention relates to pressure-sensitive adhesives and more particularly to stabilized adhesives containing organo phosphonates in combination with certain antioxidant materials.

Pressure-sensitive adhesive formulations based upon a cohesive imparting rubbery elastomer and a tackifier imparting resinous material are well known. The rubbery elastomeric component is primarily responsible for the internal strength of the pressure-sensitive adhesive mass. The addition of the tackifier resins to the rubbery elastomers seves to improve the adhesion and tack of the rubbery elastomer. These rubbery elastomers and tackifier resins are conventionally combined in the proportions of about 3:2 to 2:3, respectively, by weight, in commercial forms of these pressure-sensitive adhesives. There are, of course, variations from these proportions, but in the majority of commercial adhesives the rubbery elastomer and tackifier resin are within this range.

The rubbery elastomers and tackifier resins employed in the pressure-sensitive adhesive formulations are subject to change upon aging. Both the rubbery elastomeric polymers and the tackifier resins are subject to varying degrees of attack by oxygen. The chemical changes that occur when polymers are attacked by oxygen generally are of two types: degradation or cross-linking. Natural rubber such as pale crepe undergoes oxidative degradation under normal conditions of storage. The rate of oxidative degradation normally increases at elevated temperatures. The degradation of natural rubber may be further complicated when compounded with other materials such as is found in pressure-sensitive adhesive formulations. The tackifier resin itself may be subject to attack by oxidation. The peroxide fragments or tackifier free radicals which may be formed, in turn, may attack the rubber molecules. Generally, such degradative action occurring in a pressure-sensitive adhesive mass results in changes in the properties of the adhesive, if not practically complete loss of all, or any one of, the essential pressure-sensitive properties of tack, adhesion and cohesive strength.

Various compounds well known in the art as antioxidants for rubber have been employed in the adhesives in order to combat oxidative degradation. These materials include those compounds which, in their capacity to protect against oxidation, have been functionally classified as light absorbers, metal chelating agents, peroxide decomposers and free radical chain terminators. Varying degrees of success have been obtained with one or more of these types of antioxidants, but with no pattern of predictability as to just which types or combinations thereof would give the desired results. In some instances the materials will not serve to protect the rubbery elastomer when in the presence of the tackifier resin. In other cases, the materials may adversely affect the pressure sensitivity of the adhesive, even though the antioxidant agent may protect the adhesive components against oxidative degradation. Mere combinations of different types of antioxidants do not necessarily solve the problem of improving the stability of the adhesives for there have been instances where combinations of two or more types of antioxidants proved to be far less effective than the same quantity of any one of the antioxidants used alone in the pressure-sensitive adhesive system. Accordingly, the effect of any single rubber antioxidant or combinations thereof upon the properties of a pressure-sensitive adhesive remains inexplicably unpredictable for the most part.

This invention is directed to pressure-sensitive adhesive mixtures of a rubbery elastomer and a tackifier resin, the rubbery elastomer consisting of or containing natural rubber, such as pale crepe rubber and smoked sheet rubber, or similar rubbery elastomer containing cis-isoprenoid units in the rubber molecule, such as synthetic cis-polyisoprene. The use of acidic tackifier resins such as rosin which contains carboxylic acid groups as the sole tackifier component, or in predominant amounts in combination with other tackifier resins, should be avoided. Preferably, the tackifier should consist solely of neutral resins, although small amounts of carboxylic acid containing resins may be tolerated in the adhesive systems of this invention.

In accordance with this invention, to these pressure-sensitive mixtures of rubbery elastomers and tackifier resins are added a mixture of diorgano-phosphonate compound and either organic phenolic or secondary amine antioxidant. The diorgano-phosphonates are phosphonates wherein the organic groupings may be alkyl groups, aryl groups, aralkyl groups or alkaryl groups. These phosphonate compounds correspond to the following formula, $(RO)_2P(O)H$, wherein R may be any one of the aforementioned organic groupings.

The stabilizing effect of the combination or organo phosponates with the amine and phenolic antioxidants is illustrated in the following examples, wherein the diorgano phosphonates are illustrated by diethyl phosphonate.

EXAMPLES 1 TO 4

A cyclohexane solution was prepared of a pressure-sensitive adhesive mixture comprising pale crepe rubber, cold milled for five minutes, and polyterpene resin (softening point about 125° F.) in the proportion of about 3:2 respectively. Tape 1 was prepared from a portion of this adhesive solution to which was added polymerized trimethyl dehydroquinoline. Tape 2 was prepared from another portion of this adhesive solution to which was added a combination of trimethyl dehydroquinoline and diethyl phosphonate. Tape 3 was prepared from a third portion of this adhesive solution to which was added 2,6-di-t-butyl methoxy cresol. Tape 4 was prepared from a fourth portion of the adhesive solution to which was added the combination of 2,6-di-t-butyl methoxy cresol and diethyl phosphonate.

The secondary amine and phenolic antioxidants were added to the adhesive solutions in an amount of about 1 part per 100 parts of rubber, by weight. The diethyl phosphonate was added to the adhesive solution in an amount of about 0.7 part per 100 parts of rubber, by weight.

Table
HOT BAR CREEP, HOURS

| Tape Number | Unaged | Aged |
|---|---|---|
| 1 | 42.2 | 26.4 |
| 2 | 32.6 | 29.0 |
| 3 | 23.5 | 14.7 |
| 4 | 27.1 | 23.6 |

As shown, there is considerable improvement in the stability in the adhesives containing both the phosphonate and either the amine antioxidant or the phenolic antioxidant. The tapes having either the amine or phenolic antioxidants alone, exhibited approximately a 35% decrease in creep time. Tapes 2 and 4 on the other hand, containing the aforedescribed combinations of both an antioxidant and the phosphonate were much more stable, exhibiting only about an 11% decrease in creep time after aging.

The phenolic or secondary amine antioxidants which may be employed in combination with the phosphonates in accordance with this invention include the antioxidants known to be effective as such in rubber-resin pressure-sensitive adhesives. The secondary amine antioxidants include polynuclear substituted phenylene diamines such as N,N'-di-beta-naphthyl-1,4 phenylene diamine (AgeRite Resin D); mononuclear substituted amines such as alkyl substituted diphenylamines, for example, mixtures of octylated diphenylamines of the type sold under the trademark AgeRite Stalite S; and polynuclear heterocyclic amines such as polymerized trimethyl dehydroquinoline (AgeRite Resin D). Phenolic antioxidants are generally monocyclic and polycyclic hindered phenols as illustrated by alkylated monocyclic phenols such as di-t-butyl methoxy cresol (Antioxidant 762), di-t-butyl dimethylamino cresol (Antioxidant 703), and 2,5 di-t-amyl hydroquinone (Santovar A); methylene bridged polycyclic phenols such as 4,4-methylene bis-(2-methyl, 6-t-butyl phenol) (Antioxidant 720) and dimethyl methylene bis-(t-butyl phenol) (AgeRite Superlite); and sulfur bridged polycyclic phenols such as thio-bis-(2-methyl, 6-t-butyl p-phenol) (Antioxidant 736).

Generally, the dialkyl phosphonates are preferred in the systems of this invention. Suitable dialkyl phosphonates include the di-t-butyl, diisopropyl-, dimethyl-, 2-methyl-4-pentyl-, 2-ethylhexyl-, and 2,6-dimethylheptyl-phosphonates. Only very small amounts of the phosphonates need be employed in the adhesives.

The amount of antioxidant, amine, phenolic or mixtures thereof, for the purposes of this invention need not be any different from the amount conventionally employed for antioxidant purposes in pressure-sensitive adhesives. Uusually these antioxidants are employed in amounts of about 2% or less, seldom more than about 5% by weight of the rubbery elastomeric component. Similarly small amounts of the diorgano phosphonates are effective for the improvements provided in accordance with this invention. The maximum amount of phosphonate to be used will be dictated by the nature of the organo groups and the compatibility thereof with the adhesive ingredients. The compatible and effective amount of the phosphonate can easily be determined by simple experimentation for each of the diorgano phosphonates.

In addition to natural rubber and cis-isoprenoid rubbers, the adhesives can contain minor amounts of synthetic non-isoprenoid rubbery elastomers such as polyisobutylene, butadiene-styrene rubbers, butadiene-acrylonitrile rubbers and butyl rubbers for example. Tackifier resins containing carboxylic acid groups may also be present in the adhesive systems to a limited extent, although the tackifier resin component should consist predominantly of a neutral resin such as polyterpene resins, petroleum hydrocarbon resins, or exterified wood rosin. Suitable fillers include silica, zinc oxide, dixie clay and mixtures thereof.

The hot bar creep test was conducted by uniformly pressing a one inch wide sample of tape, adhesive side down, on a 1¾" x 2" stainless steel plate, both tape and plate aligned longitudinally, and with end portions of the tape extending beyond the ends of the plate. This was done approximately 24 hours prior to testing. At one end of the plate, the tape was cut to coincide exactly with the end of the plate. The plate was then attached to the vertical surface of a heated bar (about 160°±5° F.) so that the cut edge of the tape was at the top of the plate. The plates and tapes were permitted to come to thermal equilibrium and a 1000 gram weight was then attached to the bottom free end of the tape and the time noted. At regular intervals the distance from the top edge of the plate to the top edge of the tape was measured to the $1/32$ of an inch. The creep time values reported those for $1/2"$ creep.

What is claimed is:

1. A pressure-sensitive adhesive tape comprising a backing having a surface coated with a layer of a pressure-sensitive adhesive, said adhesive comprising: a rubbery elastomeric component consisting essentially of a cis-isoprenoid rubbery elastomer; a neutral tackifier resin; a diorgano-hydrogenphosphonate having the formula $(RO)_2P(O)H$ wherein R is selected from the groups consisting of alkyl, aryl, alkaryl and aralkyl groups; and an antioxidant selected from the group consisting of alkyl substituted phenols and secondary amines.

2. A pressure-sensitive adhesive tape comprising a backing having a surface coated with a layer of a pressure-sensitive adhesive, said adhesive comprising: a rubbery elastomeric component consisting essentially of a cis-isoprepnoid rubbery elastomer; a neutral tackifier resin; a dialkyl-hydrogenphosphonate; and an antioxidant selected from the group consisting of alkyl substituted phenols and secondary amines.

3. A pressure-sensitive adhesive tape comprising a backing having a surface coated with a layer of a pressure-sensitive adhesive, said adhesive comprising: a rubbery elastomeric component consisting essentially of a cis-isoprepnoid rubbery elastomer; a neutral tackifier resin; a diethyl-hydrogenphosphonate; and an antioxidant selected from the group consisting of alkyl substituted phenols and secondary amines.

4. A pressure-sensitive adhesive tape in accordance with claim 1 wherein said cis-isoprenoid rubbery elastomer is natural rubber.

5. A pressure-sensitive adhesive tape in accordance with claim 1 wherein said cis-isoprenoid rubbery elastomer is synthetic cis-polyisoprene.

6. A pressure-sensitive adhesive tape comprising a backing having a surface coated with a layer of a pressure-sensitive adhesive, said adhesive comprising: a rubbery elastomeric component consisting essentially of a cis-isoprenoid rubbery elastomer; a neutral tackifier resin; a minor amount, up to about 5% by weight of said rubber elastomeric component, of a diorgano-hydrogenphosphonate having the formula $(RO)_2P(O)H$ wherein R is selected from the groups consisting of alkyl, aryl, alkaryl and aralkyl groups; and from about 1 to about 5% by weight of the rubbery elastomeric component of an antioxidant selected from group consisting of alkyl substituted phenols and secondary amines.

7. A pressure-sensitive adhesive tape comprising a backing having a surface coated with a layer of a pressure-sensitive adhesive, said adhesive comprising: a rubbery elastomeric component consisting essentially of natural rubber; a neutral tackifier resin; a minor amount, up to about 5% by weight of said rubber elastomeric component, of a diorgano-hydrogenphosphonate having the formula $(RO)_2P(O)H$ wherein R is selected from the groups consisting of alkyl, aryl, alkaryl and aralkyl groups; and from about 1 to about 5% by weight of the rubbery elastomeric component of an antioxidant selected from group consisting of alkyl substituted phenols and secondary amines.

8. A pressure-sensitive adhesive tape comprising a backing having a surface coated with a layer of a pressure-sensitive adhesive, said adhesive comprising: a rubbery elastomeric component consisting essentially of synthetic cis-polyosprene rubber; a neutral tackifier resin; a minor amount, up to about 5% by weight of said rubber elastomeric component, of a diorgano-hydrogenphosphonate having the formula $(RO)_2P(O)H$ wherein R is selected from the groups consisting of alkyl, aryl, alkaryl and aralkyl groups; and from about 1 to about 5% by weight of said rubbery elastomeric component of an antioxidant selected from group consisting of alkyl substituted phenols and secondary amines.

9. A pressure-sensitive adhesive tape comprising a backing having a surface coated with a layer of a pressure-sensitive adhesive, said adhesive comprising: a rubbery elastomeric component consisting essentially of natural rubber; a neutral tackifier resin; a minor amount, up to about 5% by weight of said elastomeric component, of a dialkyl-hydrogenphosphonate; and from about 1 to 5% by weight of said rubbery elastomeric component of an antioxidant selected from the group consisting of alkyl substituted phenols and secondary amines.

10. The pressure-sensitive adhesive tape in accordance with claim 6, wherein the dialkyl-hydrogenphosphonate is diethyl-hydrogenphosphate.

11. A pressure-sensitive adhesive tape comprising a backing having a surface coated with a layer of a pressure-sensitive adhesive, said adhesive comprising: a rubbery elastomeric component consisting essentially of synthetic cis-polyisoprene; a neutral tackifier resin; a minor amount, up to about 5% by weight of said elastomeric component, of a dialkyl-hydrogenphosphonate; and from about 1 to 5% by weight of said rubbery elastomeric component of an antioxidant selected from the group consisting of alkyl substituted phenols and secondary amines.

12. The pressure-sensitive adhesive tape in accordance with claim 8 wherein the dialkyl-hydrogenphosphonate is diethyl-hydrogenphosphate.

13. A pressure-sensitive adhesive comprising: a rubbery elastomeric component consisting essentially of a cis-isoprenoid rubbery elastomer; a neutral tackifier resin; a diorgano-hydrogenphosphonate having the formula $(RO)_2P(O)H$ wherein R is selected from the groups consisting of alkyl, aryl, alkaryl and aralkyl groups; and an antioxidant selected from the group consisting of alkyl substituted phenols and secondary amines.

References Cited in the file of this patent

UNITED STATES PATENTS

| | | |
|---|---|---|
| 2,587,477 | Hunter | Feb. 26, 1952 |
| 3,004,867 | Collins et al. | Oct. 17, 1961 |
| 3,006,945 | Goddard et al. | Oct. 31, 1961 |
| 3,058,930 | Samour | Oct. 16, 1962 |
| 3,067,057 | Dabroski | Dec. 4, 1962 |
| 3,080,338 | Nudenberg | Mar. 5, 1963 |